United States Patent
McFarland

(10) Patent No.: US 10,678,980 B2
(45) Date of Patent: Jun. 9, 2020

(54) COMBINATION MAP BASED COMPOSITE DESIGN

(71) Applicant: Assurant Design Automation LLC, Kennesaw, GA (US)

(72) Inventor: M. David McFarland, Kennesaw, GA (US)

(73) Assignee: Assurant Design Automation LLC, Kennesaw, GA (US)

( * ) Notice: Subject to any disclaimer, the term of this patent is extended or adjusted under 35 U.S.C. 154(b) by 184 days.

(21) Appl. No.: 15/974,478

(22) Filed: May 8, 2018

(65) Prior Publication Data

US 2018/0253513 A1    Sep. 6, 2018

Related U.S. Application Data

(63) Continuation-in-part of application No. 14/727,598, filed on Jun. 1, 2015, now abandoned.

(51) Int. Cl.
| G06F 30/327 | (2020.01) |
| G06F 30/30 | (2020.01) |
| G06F 111/20 | (2020.01) |

(52) U.S. Cl.
CPC ............ *G06F 30/327* (2020.01); *G06F 30/30* (2020.01); *G06F 2111/20* (2020.01)

(58) Field of Classification Search
None
See application file for complete search history.

(56) References Cited

U.S. PATENT DOCUMENTS

| 4,065,915 | A  | 1/1978  | Farnbach |
| 6,215,327 | B1 | 4/2001  | Lyke |
| 6,628,215 | B2 | 9/2003  | Talwar et al. |
| 6,654,950 | B1 | 11/2003 | Barnishan |
| 6,898,563 | B1 | 5/2005  | McFarland |
| 7,346,864 | B2 | 3/2008  | Srouji et al. |
| 7,605,607 | B2 | 10/2009 | Ng |
| 7,784,005 | B1 | 8/2010  | Ng |
| 7,890,896 | B2 | 2/2011  | Moon |
| 8,739,084 | B2 | 5/2014  | Swann |
| 9,112,490 | B1 | 8/2015  | Hamlet et al. |
| 9,396,298 | B1 | 7/2016  | McFarland |

(Continued)

OTHER PUBLICATIONS

U.S. Appl. No. 14/727,517, Office Action Summary, dated Aug. 25, 2017, pp. 1-13.

(Continued)

*Primary Examiner* — Jack Chiang
*Assistant Examiner* — Aric Lin
(74) *Attorney, Agent, or Firm* — Kunzler Bean & Adamson

(57) ABSTRACT

For combination map based design, a method defines one or more logic elements including one or more binary output variables and one or more binary input variables. The method further assigns the one or more logic elements to a combination map. In addition, the method defines one or more logic element relationships between the logic elements on the combination map. The method encodes a plurality of fields of the combination map as a linear array that includes a plurality of logic states. Each logic state includes the one or more binary output variables, the one or more binary input variables, one or more minterms of the one or more binary input variables, one or more maxterms of the one or more minterms, one or more present state values, and one or more next state values.

18 Claims, 22 Drawing Sheets

(56) References Cited

U.S. PATENT DOCUMENTS

| | | |
|---|---|---|
| 9,535,665 B2 | 1/2017 | McFarland |
| 9,536,029 B2 | 1/2017 | McFarland |
| 9,590,858 B2 | 3/2017 | McFarland |
| 2001/0044708 A1 | 11/2001 | Talwar et al. |
| 2006/0095824 A1 | 5/2006 | McGrath |
| 2007/0011113 A1 | 1/2007 | Mosleh et al. |
| 2007/0118339 A1 | 5/2007 | Moon |
| 2009/0204931 A1 | 8/2009 | Lim et al. |
| 2010/0229132 A1 | 9/2010 | Gu et al. |
| 2013/0019215 A1 | 1/2013 | Swann |
| 2013/0125104 A1 | 5/2013 | Valluri et al. |
| 2014/0085979 A1 | 3/2014 | Kono |
| 2016/0350087 A1 | 12/2016 | McFarland |
| 2016/0350447 A1 | 12/2016 | McFarland |
| 2016/0350448 A1 | 12/2016 | McFarland |
| 2016/0350449 A1 | 12/2016 | McFarland |
| 2016/0350450 A1 | 12/2016 | McFarland |
| 2016/0350668 A1 | 12/2016 | McFarland |
| 2018/0300112 A1 | 10/2018 | McFarland |
| 2018/0330023 A1 | 11/2018 | McFarland |
| 2018/0330024 A1 | 11/2018 | McFarland |
| 2018/0330025 A1 | 11/2018 | McFarland |
| 2018/0330026 A1 | 11/2018 | McFarland |

OTHER PUBLICATIONS

U.S. Appl. No. 14/727,517, Office Action Summary, dated Jun. 21, 2017, pp. 1-24.

U.S. Appl. No. 14/727,544, Office Action Summary, dated Aug. 10, 2017, pp. 1-44.

U.S. Appl. No. 14/727,580, Office Action Summary, dated Aug. 10, 2017, pp. 1-28.

U.S. Appl. No. 14/727,598, Office Action Summary, dated Aug. 10, 2018, pp. 1-38.

U.S. Appl. No. 14/727,530, Office Action Summary, dated Oct. 2, 2017, pp. 1-34.

U.S. Appl. No. 14/727,555, Office Action Summary, dated Nov. 2, 2017, pp. 1-12.

U.S. Appl. No. 14/727,530, Office Action Summary, dated Feb. 9, 2018, pp. 1-21.

U.S. Appl. No. 14/727,517, Office Action Summary, dated Feb. 8, 2018, pp. 1-23.

U.S. Appl. No. 14/727,544, Office Action Summary, dated Feb. 8, 2018, pp. 1-21.

U.S. Appl. No. 14/727,580, Office Action Summary, dated Feb. 8, 2018, pp. 1-20.

U.S. Appl. No. 14/727,598, Office Action Summary, dated Feb. 8, 2018, pp. 1-21.

U.S. Appl. No. 14/727,555, Office Action Summary, dated Mar. 22, 2018, pp. 1-15.

185

| Logic Element ID |
| 450 |
| Logic Element Type |
| 455 |
| Input IDs |
| 456 |
| Output IDs |
| 457 |
| Partition ID |
| 459 |
| Execution Time |
| 377 |
| Package ID |
| 461 |

FIG. 2F

| | | |
|---|---|---|
| 161 — Input Variables 162 | | Output Variables 163 |
| 161 — Input Variables 162 | | Output Variables 163 |
| 161 — Input Variables 162 | | Output Variables 163 |

COMBINATION MAP BASED COMPOSITE DESIGN

CROSS-REFERENCE TO RELATED APPLICATIONS

This is a continuation-in-part application of and claims priority to U.S. patent application Ser. No. 14/727,598 entitled "COMBINATION MAP BASED COMPOSITE DESIGN" and filed on Jun. 1, 2015 for M. David McFarland, which is incorporated herein by reference.

FIELD

The subject matter disclosed herein relates to combination maps and more particularly relates to a combination map based composite design.

BACKGROUND

Description of the Related Art

Logic designs incorporate numerous logic elements and logic element relationships. As a result, it may be unwieldy to analyze and manipulate a logic design.

Brief Summary

A method for combination map based design is disclosed. The method defines one or more logic elements including one or more binary output variables and one or more binary input variables. The method further assigns the one or more logic elements to a combination map. In addition, the method defines one or more logic element relationships between the logic elements on the combination map. The method encodes a plurality of fields of the combination map as a linear array that includes a plurality of logic states. Each logic state includes the one or more binary output variables, the one or more binary input variables, one or more minterms of the one or more binary input variables, one or more maxterms of the one or more minterms, one or more present state values, and one or more next state values. A program product and apparatus also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2F is a schematic block diagram illustrating one embodiment of logic element data;

DETAILED DESCRIPTION

Figure 1A:
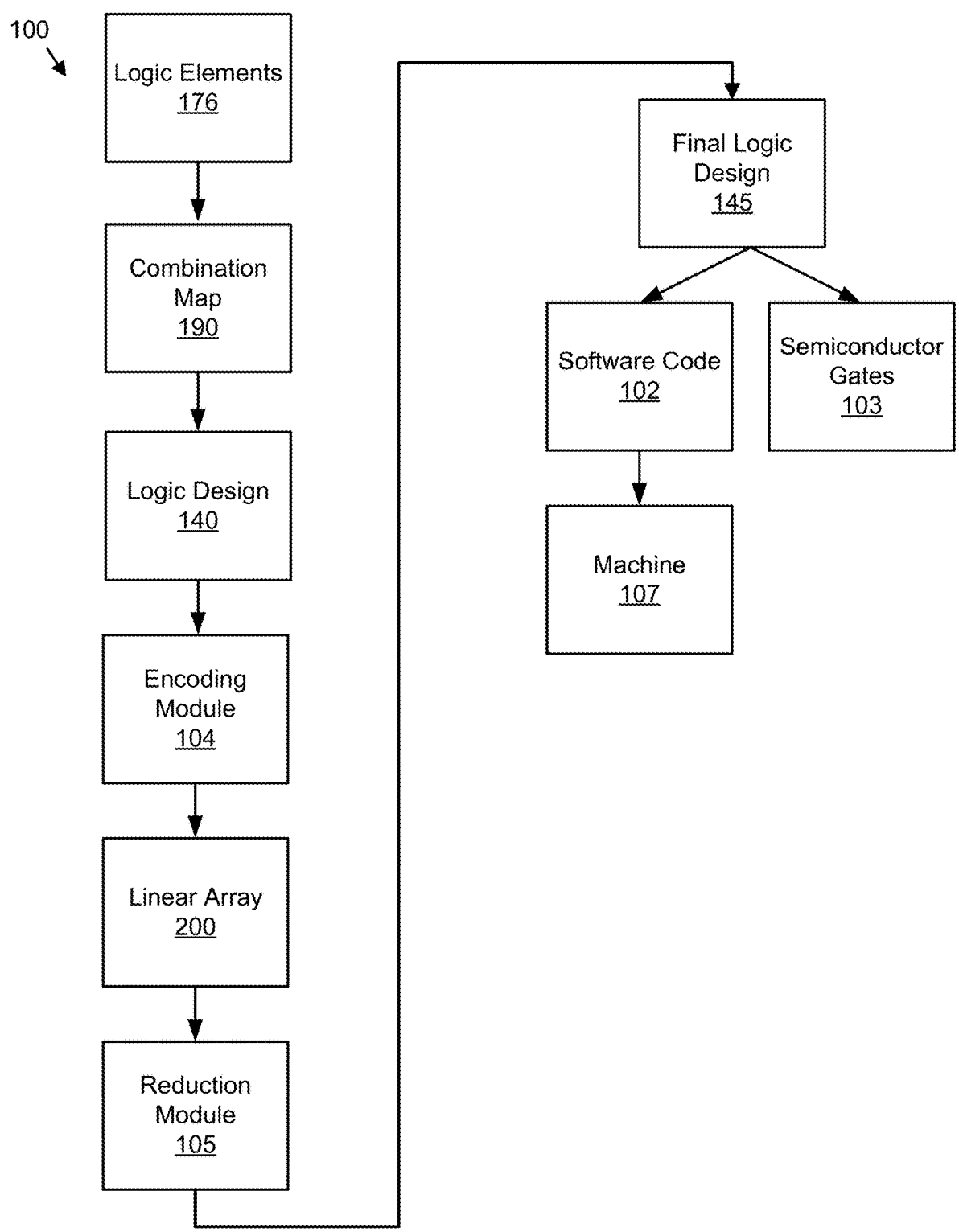
FIG. 1A is a schematic block diagram illustrating one embodiment of a logic design process.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage medium storing machine readable code, computer readable code, and/or program code, referred hereafter as code. The computer readable storage medium may be tangible, non-transitory, and/or non-transmission. The computer readable storage medium may not embody signals. In a certain embodiment, the storage devices only employ signals for accessing code.

The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Ada, Python, Ruby, Java, Smalltalk, C++, or the like, and conventional procedural programming languages, such as the "C" programming language, SQL, relay ladder logic, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a logic design process 100. In the depicted embodiment, logic elements 176 are entered into a combination map 190 to create a logical design 140. The combination map 190 may describe logical operations that are implemented in hardware, implemented in software, implemented as abstract logic, or combinations thereof.

The logic design 140 typically specifies a plurality of inputs, conditions, actions, outputs, states and/or process flows, referred to hereinafter as logic elements 176. In addition, the logic design 140 specifies some of the interactions between the logic elements 176.

The embodiments described herein define the logic design 140 using the combination map 190. Using the combination map 190 exposes a user to all of the logic elements 176 and logic element relationships of the logic design 140. As a result, the user may explicitly define logic element relationships that may be left undefined by other logic design entry methods.

Unfortunately, describing all of the possible interactions between the logic elements 176 in the logic design 140 results in the generation of a data structure that grows exponentially with the number of logic elements 176. As a result, even for modest logic designs 140, the logic design 140 may be intractably complex. A user of the logic design 140 may have difficulty analyzing and manipulating the logic design 140. As a result, logic designs 140 created with other definition methods often have undefined logic element relationships. These undefined logic element relationships may result in unexpected and even catastrophic behaviors when implemented in a device.

The encoding module 104 encodes the logical design 140 from the combination map 190 into a linear array 200 that greatly reduces the complexity of the logic design 140. As a result, the user may more easily manipulate and analyze the logical elements and logic element relationships of the linear array 200. Thus the user may more easily identify and resolve undefined logic element relationships.

The linear array 200 may be further reduced by the reduction module 105 and modified by the user to generate a final logic design 145. As a result, the embodiments generate a final logic design 145 that is more robust because all logic element relationships may be defined. In addition, the linear array 200 may be used to validate the final logic design 145.

In one embodiment, the final logic design 145 is implemented in software code 102. The software code 102 may implement the Boolean logic of the final logic design 145. The software code 102 may be compiled and/or executed on a machine 107 such as a computer or controller. In addition, the final logic design 145 may be fabricated in semiconductor gates 103. The semiconductor gates 103 may implement the Boolean logic of the final logic design 145.

Figure 1B:
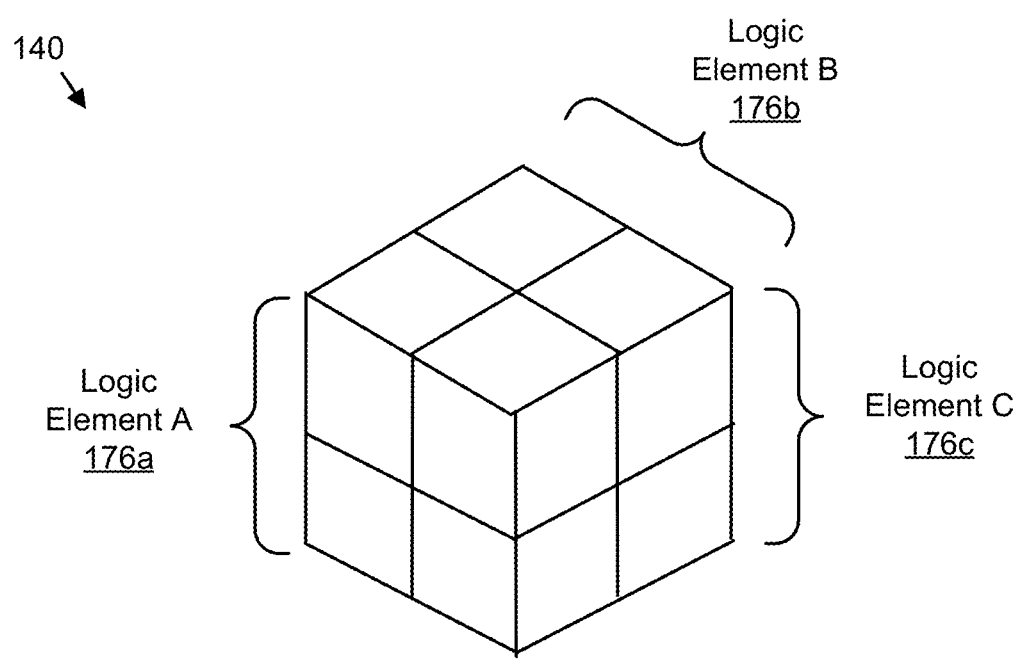
FIG. 1B is a drawing illustrating one embodiment of a multidimensional logical array.

FIG. 1B is a drawing illustrating one embodiment of a multidimensional logical array logic design 140. For simplicity, the multidimensional logical array logic design 140 is shown for three logic elements 176. As shown, the multidimensional logic array logic design 140 for only three logic elements 176 results in $2^N$ or 8 logic element relationships. For even modest logic designs 140, the number of logic element relationships quickly becomes intractable. The embodiments described herein encode logic designs 140 defined with the combination map 190 into a linear array 200. The linear array 200 may be examined to identify and define undefined logic element relationships, as well as to validate the final logic design 145 as will be described hereafter.

Figure 1C:
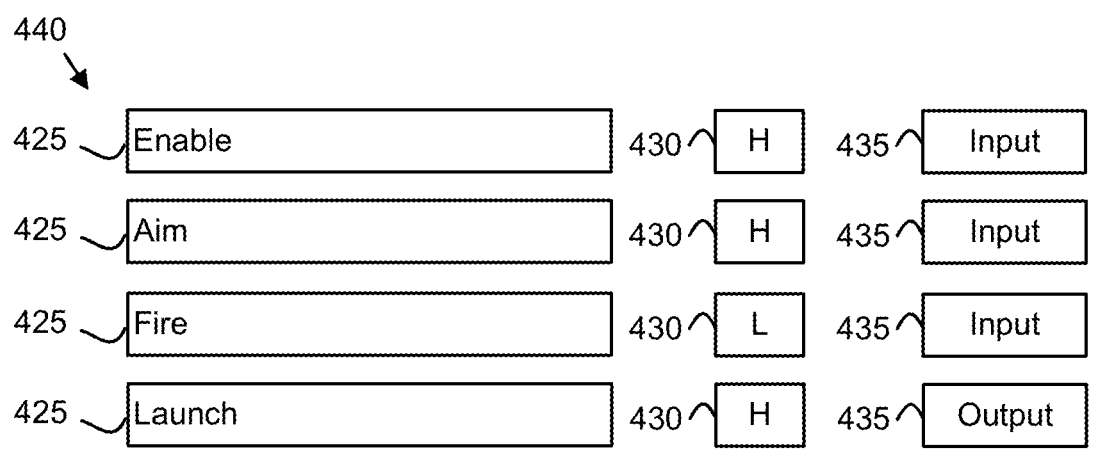
FIG. 1C is a drawing illustrating one embodiment of logic element input.

FIG. 1C is a drawing illustrating one embodiment of logic element input 440. A plurality of binary variable label fields 425, assertion value fields 430, and binary variable type fields 435 are shown. The binary variable label fields 425, assertion value fields 430, and variable type fields 435 may be displayed to the user to receive binary variables for the combination map 190.

The user may enter a logic element identifier in the binary variable label fields 425. FIG. 1C shows exemplary logic element identifiers in the binary variable label fields 425.

The assertion value fields 430 define assertion values for each binary variable. In the depicted embodiment, each binary variable may be asserted high or asserted low.

The variable type fields 435 define the binary variable type. The binary variable type indicates whether each binary variable is a binary input variable or a binary output variable. Binary input variables are inputs received by a device generated from the final logic design 145 and/or software embodied the final logic design 145. Binary output variables are communicated from the device or software.

The user may enter the logic element identifiers, assertion values, and binary variable types for logic elements including binary input variables and binary output variables. The logic elements may be used to generate the combination map 190 as will be described hereafter.

Figure 1D:
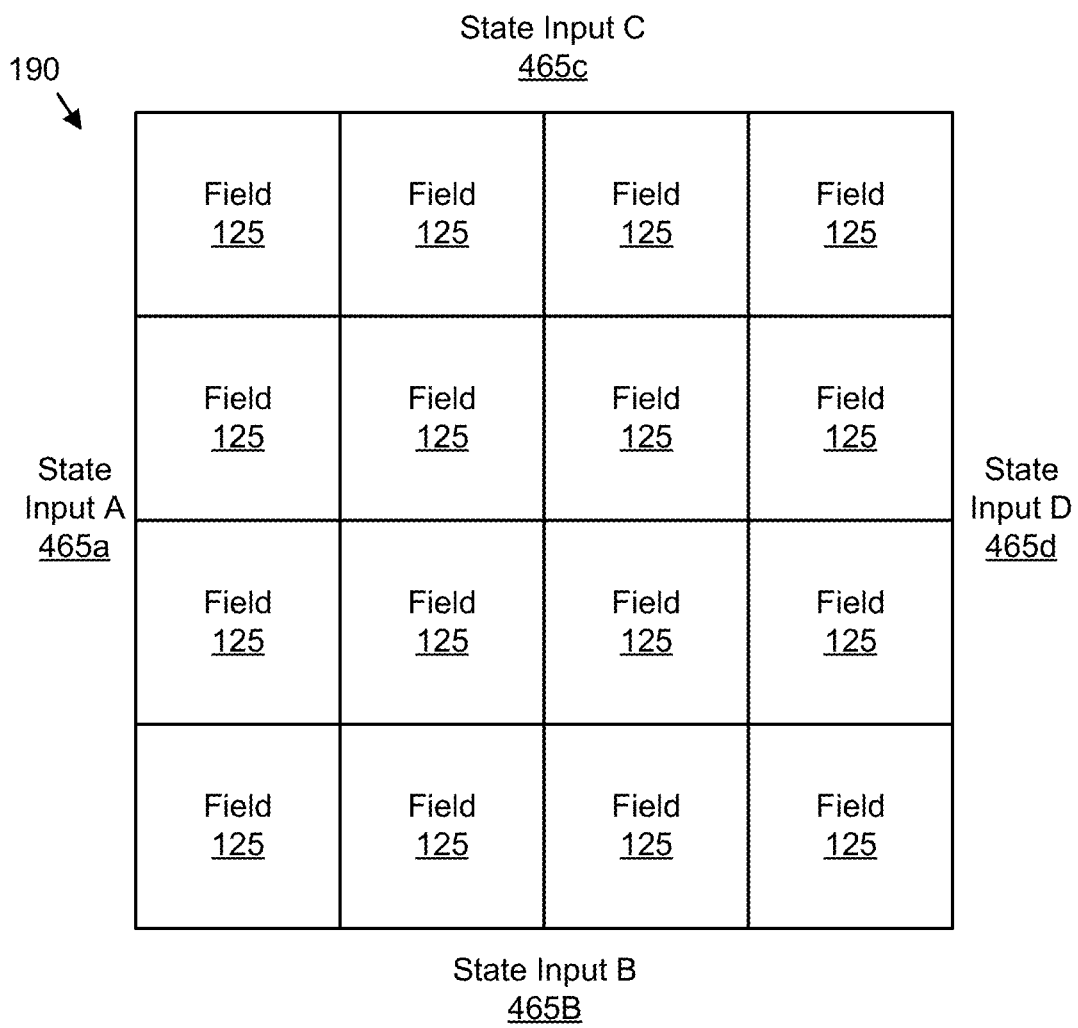
FIG. 1D is a drawing illustrating one embodiment of a combination map.

FIG. 1D is a drawing illustrating one embodiment of a combination map 190. In the depicted embodiment, fields 125 are shown for four state inputs 465. Each combination map 190 may have $2^N$ fields 125, where N is the number of state inputs 465. Thus a combination map 190 may have 8 fields 125 for three state inputs 465.

Each state input 465 is one of a binary input variable and a present state value. Each field 125 is associated with unique field data as will be described hereafter. Each field 125 may represent a logic state. Alternatively, each field 125 may represent a plurality of logic states. In addition, a field 125 may represent a logical expression such as minterms for a logic state.

Figure 1E:
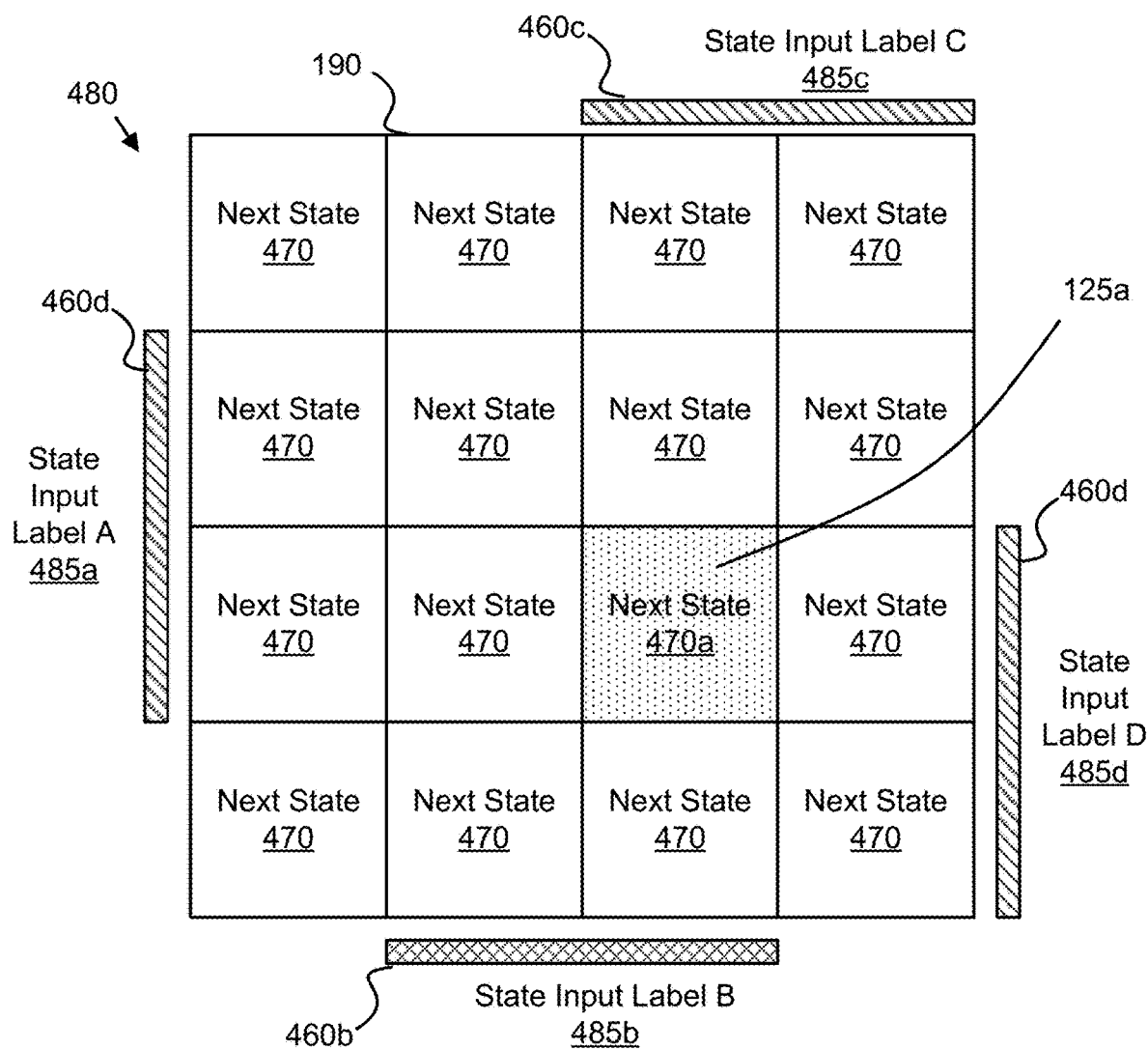
FIG. 1E is a drawing illustrating one embodiment of a combination map display.

FIG. 1E is a drawing illustrating one embodiment of a combination map display 480. A combination map 190 may be displayed on the display of a computer. State input labels 485 are shown for each state input 465. Assertion bars 460 indicate whether each state input 465 is asserted or deasserted. In one embodiment, the assertion bar indicates columns or rows where the state input 465 is asserted.

If the state inputs 465 indicated by the state input labels 485 are present state values, each field 125 may represent a logic state. A user may be prompted to enter a logic state identifier for each logic state.

In addition, each field 125 may define an assertion value for the one or more binary output variables. The user may be prompted to define the assertion value of a binary output variable for each field 125 and/or each logic state.

Each field 125 of FIG. 1D displays a next state 470 if the state inputs 465 for the field 125 are asserted. The next state 470 may be next state values 230, a logic state identifier 210, or combinations thereof.

In the depicted embodiment, a first field 125a is defined as asserted as a result of each the state inputs 465 identified by the state input labels 485 being asserted. As a result, upon completion of the logic state defined by the present state values, the next state values associated with a first next state 470a will be asserted.

Figure 1F:
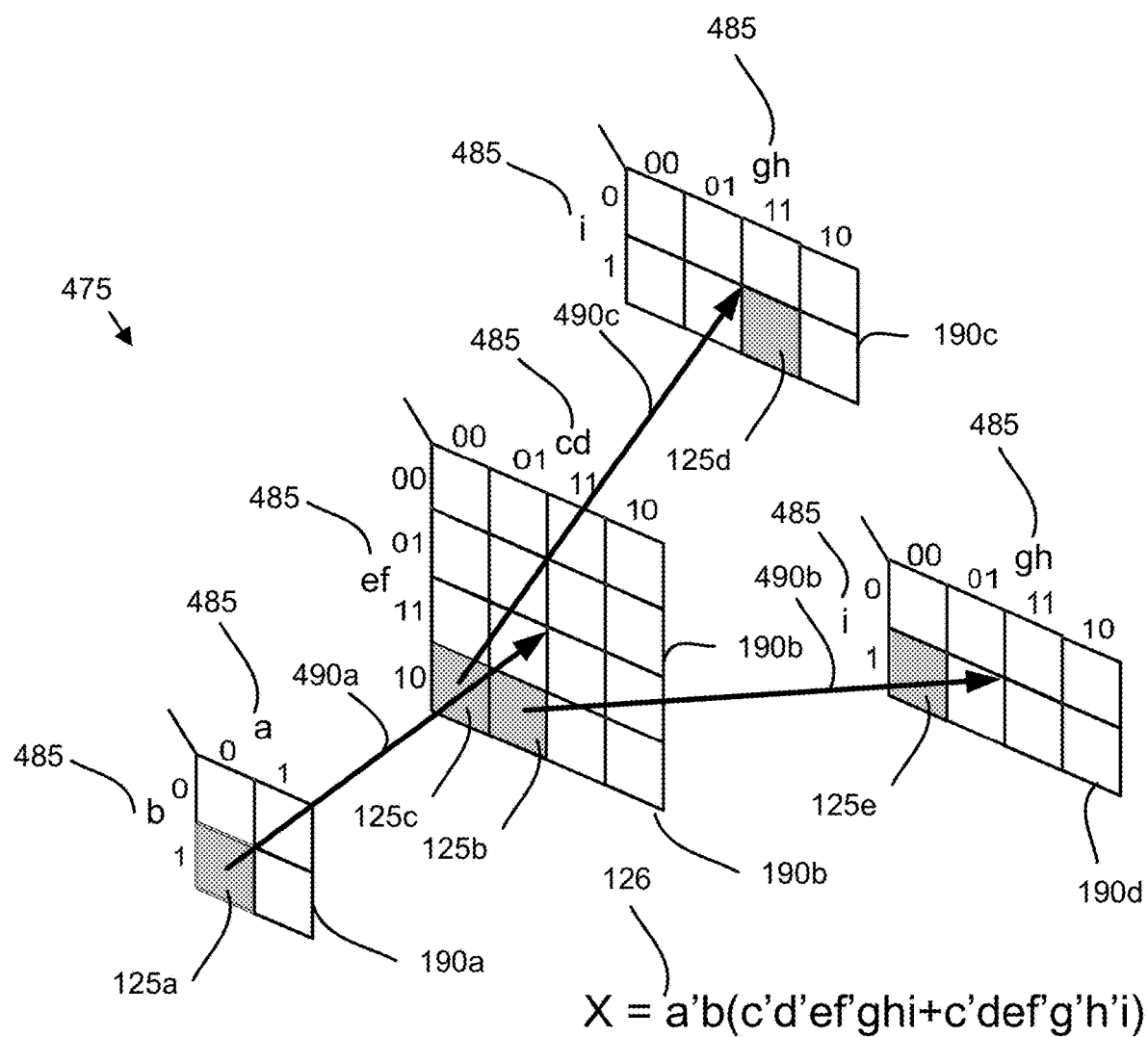
FIG. 1F is a drawing illustrating one embodiment of combination map levels.

FIG. 1F is a drawing illustrating one embodiment of combination map level display 475. A plurality of combination maps 190 are shown as though displayed on the display of the computer. Each field 125 may correspond to a Boolean equation. The Boolean equation may include one or more minterms and/or one or more maxterms. In a certain embodiment, each field 125 also corresponds to a logic state.

In one embodiment, each combination map 190 on a lower level, such as combination maps 190b-d, corresponds to only one field 125 on a combination map 190 of an upper level, such as combination map 190a. The state input labels

485 may indicate the state inputs 465 such as present state values 220 and binary input variables 215 that define the fields 125. Assertion values 290 are also indicated for the state inputs 465.

In one embodiment, the fields 125 of the upper level combination maps 190 correspond to logic states 205. For example, each field 125 of the top-level combination map 190*a* may correspond to a logic state 205. Alternatively, the fields 125 of two or more upper level combination maps 190 may correspond to logic states 125. The state inputs 465 of the upper level combination maps 190 may be present state values 230 that indicate which logic state 205 is active.

A first field 125*a* of a first combination map 190*a* may be defined by a second combination map 190*b* as indicated by a first relationship arrow 490*a*. Each relationship arrow 490 may connect a field 125 of an upper level combination map 190 to a lower level combination map 190. The first combination map 190*a* may represent the present state values 220 a and b.

The second combination map 190*b* may represent the Boolean equation cef'. A second relationship arrow 490*b* may indicate that a second field 125*b* of the second combination map 190*b* is defined by a fourth combination map 190*d*. The fourth combination map 190*d* may represent the Boolean equation g'h'i as indicated by asserting a fifth filed 125*e*. A third relationship arrow 490*c* may indicate that a third field 125*c* is defined by a third combination map 190*c*. The third combination map 190*c* may represent the Boolean equation ghi as indicated by asserting a fourth field 125*d*. In the depicted embodiment, the combination map level display 475 represents the Boolean equation 126 X=a'b(c'd'ef-'ghi+c'def'g'h'i).

The plurality of combination maps 190 forms a multilevel display format. The multilevel display format has a top display level as illustrated by the first combination map 190*a* and at least one lower display levels as illustrated by the second and third combination maps 190*b-c*.

Each combination map 190 includes state input labels 485 that identify the state inputs 465 for the combination map 190. Relationship arrows 490 show the logical relationship between a combination map 190 and a field 125. The relationship arrows 490 may be defined by the relationship arrow data 175.

In one embodiment, relationship arrows 490 link a first field 125*a* with successive combination maps 190 at successive display levels. The relationship arrows 490 indicate a logical relationship between the fields 125.

A combination of first binary input variables 215 and/or present state values 220 for a first field 125*a* may be identified by selecting the first field 125*a* of a combination map 190*a* at first display level. In response to selecting the first field 125*a*, additional combinations of second binary input variables 215 in a successive combination map 190 that logically define the first field 125*a* may be identified. The combination map 190 of the second binary input variables 215 may be at a successive display level lower than the first display level.

In one embodiment, combination maps 190 of additional binary input variables 215 that logically define the selected first field 125*a* are displayed on combination maps 190 at each successive level until the last display level is reached. In one embodiment, the combination map 190 may be logically collapsed. A binary output variable 225 may be assigned to the combination of all binary input variables 215 on each display level of the combination maps 190 for the selected first field 125*a*. In addition, the combination of all binary input variables 215 on each display level of the combination maps 190 may be converted into a logical expression 126.

Figure 2A:
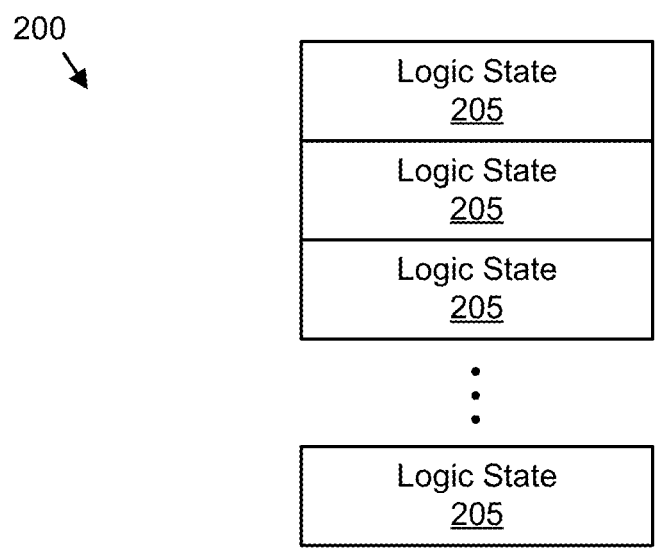
FIG. 2A is a schematic block diagram illustrating one embodiment of a linear array.

FIG. 2A is a schematic block diagram illustrating one embodiment of a linear array 200. The linear array 200 may be generated from one or more combination maps 190. The linear array 200 maybe organized as a data structure in a memory. The linear array 200 includes a plurality of logic states 205. Each logic state 205 may be generated from a field 125 of the linear array 200 as will be described hereafter.

Figure 2B:
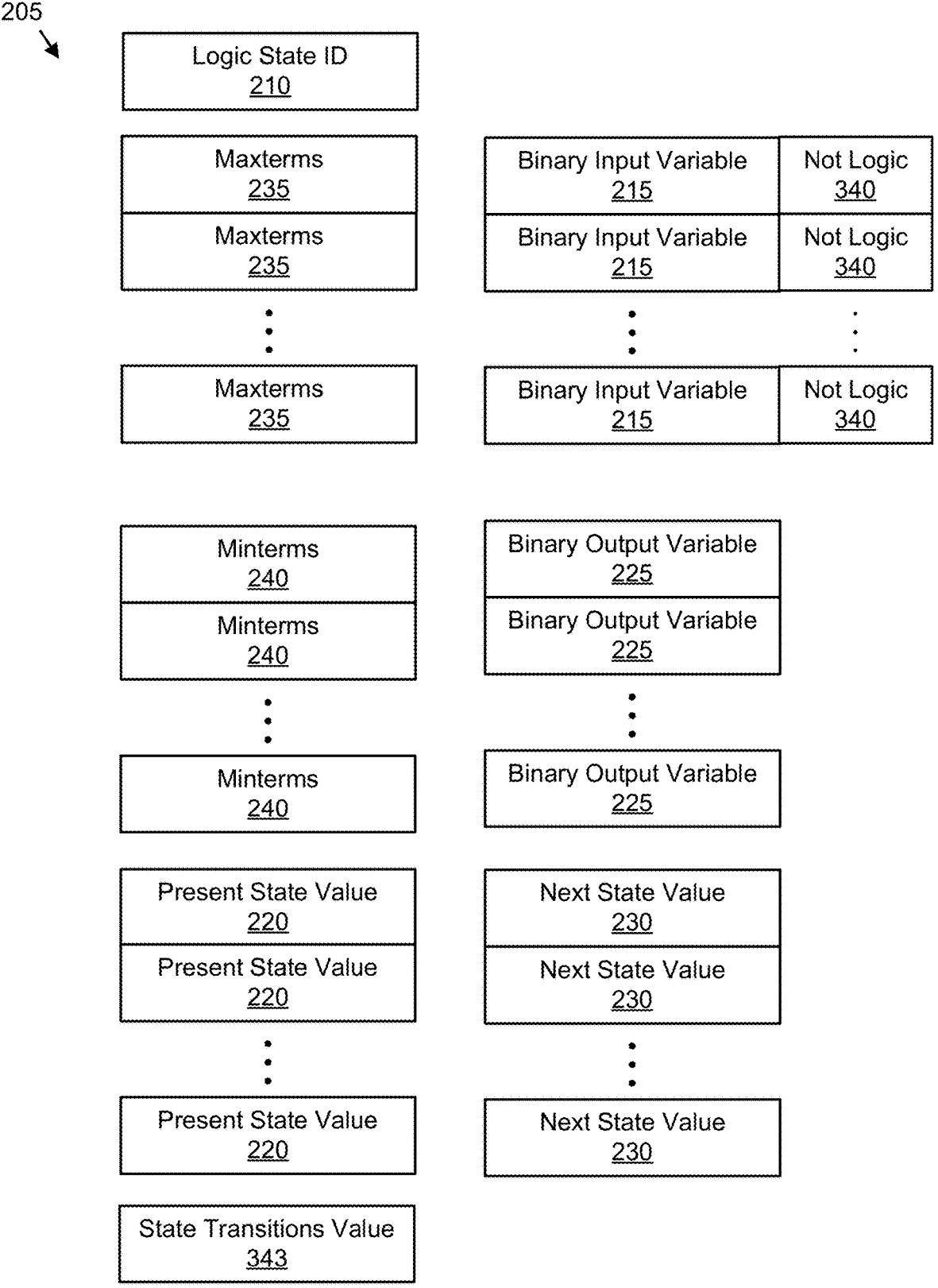
FIG. 2B is a schematic block diagram illustrating one embodiment of a logic state.

FIG. 2B is a schematic block diagram illustrating one embodiment of a logic state 205. The logic state 205 maybe organized as a data structure in a memory. The logic state 205 includes a logic state identifier 210, one or more binary input variables 215, one or more binary output variables 225, one or more next state values 230, one or more present state values 220, one or more maxterms 235, one or more minterms 240, and a state transitions value 343.

The logic state identifier 210 may uniquely identify the logic state 205. The logic state identifier 210 may include a label, a mnemonic, or the like. A user may be prompted to enter the logic state identifier 210.

The binary output variables 225 may include each binary output variable 225 from the combination maps 190. In one embodiment, each binary output variable 225 is assigned the logic element identifier as a label.

The binary input variables 215 may include each binary input variable 215 from the combination map 190. NOT logic 340 is associated with each binary input variable 215. The NOT logic 340 indicates whether an inverse of the binary input variable 215 is asserted. In one embodiment, each binary input variable 215 is assigned the logic element identifier as a label.

The present state values 220 may be binary values that uniquely define the logic state 205 from the combination map 190. Each present state value 220 may also be assigned the logic state identifier 210 as a label.

The next state values 230 may define one or more next logic states 205 that are branched to as a function of the binary input variables 215. The next state values 230 may be generated from the next state 470 of the combination map 190.

Each minterm 240 may be a binary product or logical AND of one or more binary input variables 215 for the corresponding field 125. Alternatively, each minterm 240 may be a binary product of one or more maxterms 235. In one embodiment, each minterm 240 is assigned an identifier such as a label, a logical representation, an index value, or the like.

Each maxterm 235 may be a binary sum or logical OR of one or more minterms 240 for the corresponding field 125. Alternatively, each maxterm 235 may be a binary sum of one or more binary input variables 215. In one embodiment, each maxterm 235 is assigned an identifier such as a label, a logical representation, an index value, or the like.

The state transitions value 343 may record a number of state transitions that have been traversed from a current logic state 205 to subsequent logic states 205. A state transition transitions control from the current logic state 205 to a subsequent logic state 205. For example, the current logic state 205 STATE00 may transition control to subsequent state 205 STATE01.

In one embodiment, the state transitions value 343 is incremented each time a state transition from the current logic state 205 is traversed. Alternatively, the state transitions value 343 records a total number of state transitions from the current logic state 205 to subsequent logic states 205.

A plurality of logic states 205 in the linear array 200 represents the multidimensional array of the logic design 140 in a form that is more easily manipulated and analyzed. As a result, logic element relationships may be identified and resolved as will be described hereafter.

Figure 2C:
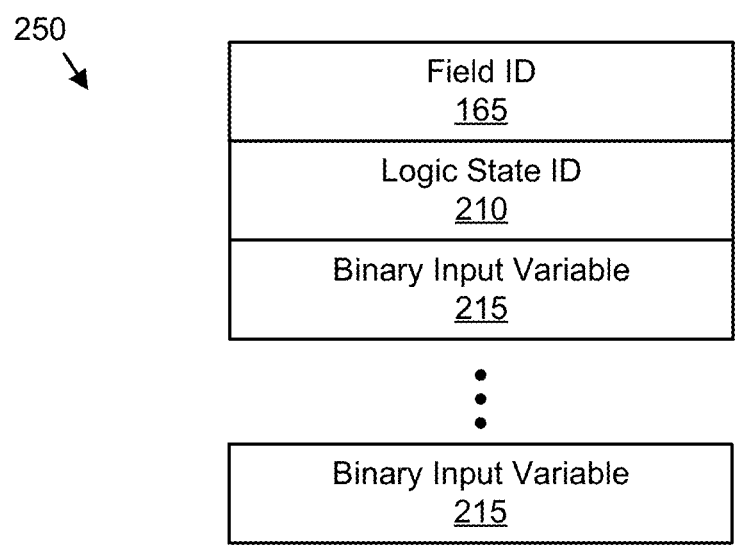
FIG. 2C is a schematic block diagram illustrating one embodiment of field data.

FIG. 2C is a schematic block diagram illustrating one embodiment of field data 250. The field data 250 describes a field in the combination map. The field data 250 maybe organized as a data structure in a memory. In the depicted embodiment, the field data 250 includes a field identifier 165, one or more logic state identifiers 210, and one or more binary input variables 215.

The field identifier 165 may uniquely identify the field in the combination map. The logic state identifier 210 may identify a logic state 205 associated with the field. Each field may represent at least one single logic state 205. The binary input variables 215 may indicate which of the binary input variables 215 for the logic state 205 is associated with the field.

Figure 2D:
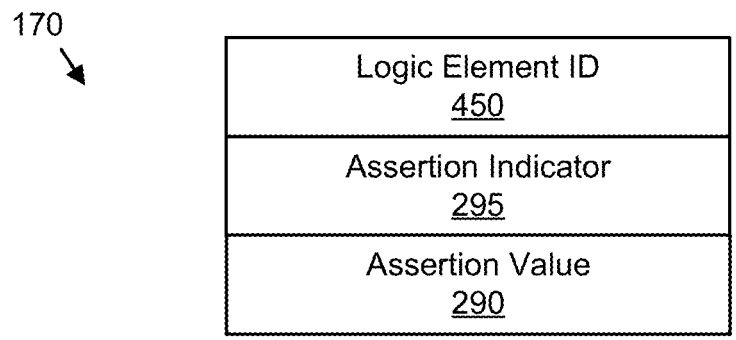
FIG. 2D is a schematic block diagram illustrating one embodiment of assertion indicator data.

FIG. 2D is a schematic block diagram illustrating one embodiment of assertion indicator data 170. The assertion indicator data 170 may indicate whether a field 125 of the combination map 190 is asserted. The assertion indicator data 170 may be organized as a data structure in a memory. In the depicted embodiment, the assertion indicator data 170 includes a logic element identifier 450, an assertion indicator 295, and an assertion value 290.

The logic element identifier 450 associates the assertion indicator data 170 with a logic element 176. The assertion value 290 specifies whether binary input variables 215, present state values 220, minterms 240, maxterms 235, binary output variables 225, next state values 230, state values 315 and other logic elements 176 are asserted, deasserted, a DON'T CARE, undefined, or unknown.

In one embodiment, the assertion indicator 295 is of an indicator type selected from the group consisting of a color, a label, an arrow, an icon, hashing, and motion. For example, the indicator type may be a color with blue indicating that a field is asserted and read indicating that the field is deasserted.

Figure 2E:
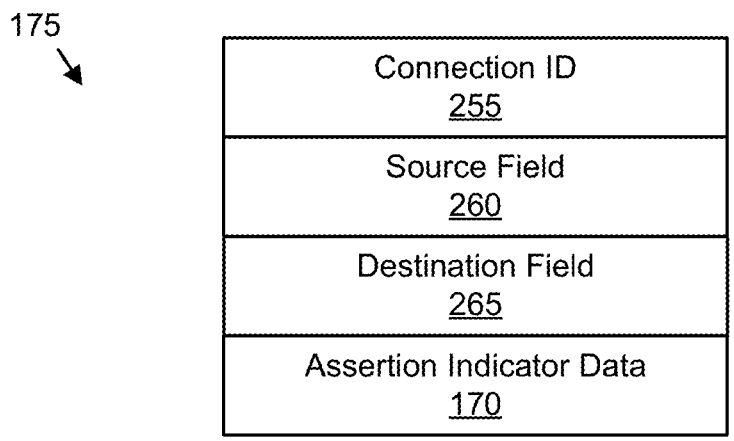
FIG. 2E is a schematic block diagram illustrating one embodiment of connection data.

FIG. 2E is a schematic block diagram illustrating one embodiment of relationship arrow data 175. The relationship arrow data 175 may define a relationship arrow between fields of the combination map as will be described hereafter. The relationship arrow data 175 maybe organized as a data structure in a memory. In the depicted embodiment, the relationship arrow data 175 includes a connection identifier 255, a source field 260, a destination field 265, and the assertion indicator data 170.

The connection identifier 255 uniquely identifies a connection between the source field 260 and the destination field 265. The connection identifier 255 may be a label, an index, or the like.

The source field 260 may identify a first field that defines a first logical element relationship. The destination field 265 may identify one or more second fields that have second logical element relationships that include the first logical element relationship. For example, the source field 260 may define a first binary input variables 215 that are included the minterms 240 of the destination field 265. The destination field 265 may be a combination map. The assertion indicator data 170 may indicate if the source field 260 and/or the connection between the source field 260 and the destination field 265 are asserted.

FIG. 2F is a schematic block diagram illustrating one embodiment of logic element data 185. The logic element data 185 may describe a logic element 176. The logic element data 185 maybe organized as a data structure in memory. In the depicted embodiment, the logic element data 185 includes a logic element identifier 450, a logic element type 455, one or more input identifiers 456, one or more output identifiers 457, a partition identifier 459, an execution time 377, and a package identifier 461.

The logic element identifier 450 may uniquely identify the logic element. The logic element identifier 450 may be a label, an index, or the like.

The logic element type 455 may specify a type such as a binary input variable 215, a binary output variable 225, the minterm 240, a maxterm 235, a present state value 220, a next state value 230, not logic 340, a relationship arrow 490, and the like. Alternatively, the logic element type 455 may specify a logic state 205, a software variable, a conditional statement, the computational statement, or the like.

The input identifiers 456 may list the logic element identifiers 450 of inputs to the logic element. The output identifiers 457 may list the logic element identifiers 450 of logic elements receiving outputs from the logic element.

The partition identifier 459 may specify a partition that the logic element 176 is assigned to. For example, the partition identifier 459 may specify the logic element is assigned to a software design partition. Alternatively, the partition identifier 459 may specify that the logic element is assigned to a hardware design partition.

The execution time 377 may specify one or more of a minimum time for a state transition, a maximum time for a state transition, an average time for a state transition, a mean time for a state transition, a medium time for a state transition, the simulation generated time for a state transition, or the like.

The package identifier 461 may specify a destination package for the logic element. The destination package may be a defined package or a computational package. The defined package and the computational package may be used to validate the linear array 200 as will be described hereafter.

Figures 2G, 2H:
FIG. 2G is a schematic block diagram illustrating one embodiment of system vectors.
FIG. 2H is a schematic block diagram illustrating one embodiment of a defined package and a computational package.

FIG. 2G is a schematic block diagram illustrating one embodiment of system vectors 161. Each system vector 161 maybe organized as a data structure and stored in a memory. In the depicted embodiment, each system vector 161 includes input variables 162 and output variables 163.

The input variables 162 may comprise one or more binary input variables 215 and one or more present state values 220. The output variables 163 may include one or more binary output variables 225 and one or more next state values 230.

The system vectors 161 may be employed to exercise all logic elements of a Boolean equation predicate. In one embodiment, the system vectors 161 may be applied to a defined package of minterms 240 as will be described hereafter.

FIG. 2H is a schematic block diagram illustrating one embodiment of a defined package 435 and a computational package 440. The minterms 240 of each logic state 205 in the linear array 200 may be partitioned to either the defined package 435 or the computational package 440. The assertion values 290 of each minterm 240 in the defined package 435 may be specified by the input variables 162 and the output variables 163 of the system vectors 161. The assertion values 290 of each minterm 240 in the computational package 440 may be calculated as a function of the minterms 240 partition to the defined package 235 as will be described hereafter.

FIG. 2H also depicts a convergence analysis tool 445. The convergence analysis tool 445 may be used to analyze the defined package 435 and the computational package 440 as will be described hereafter. The convergence analysis tool 445 may be one of a VECTORCAST® tool, a TEST-MATE® tool, and an ADATEST® tools.

Figure 3A:
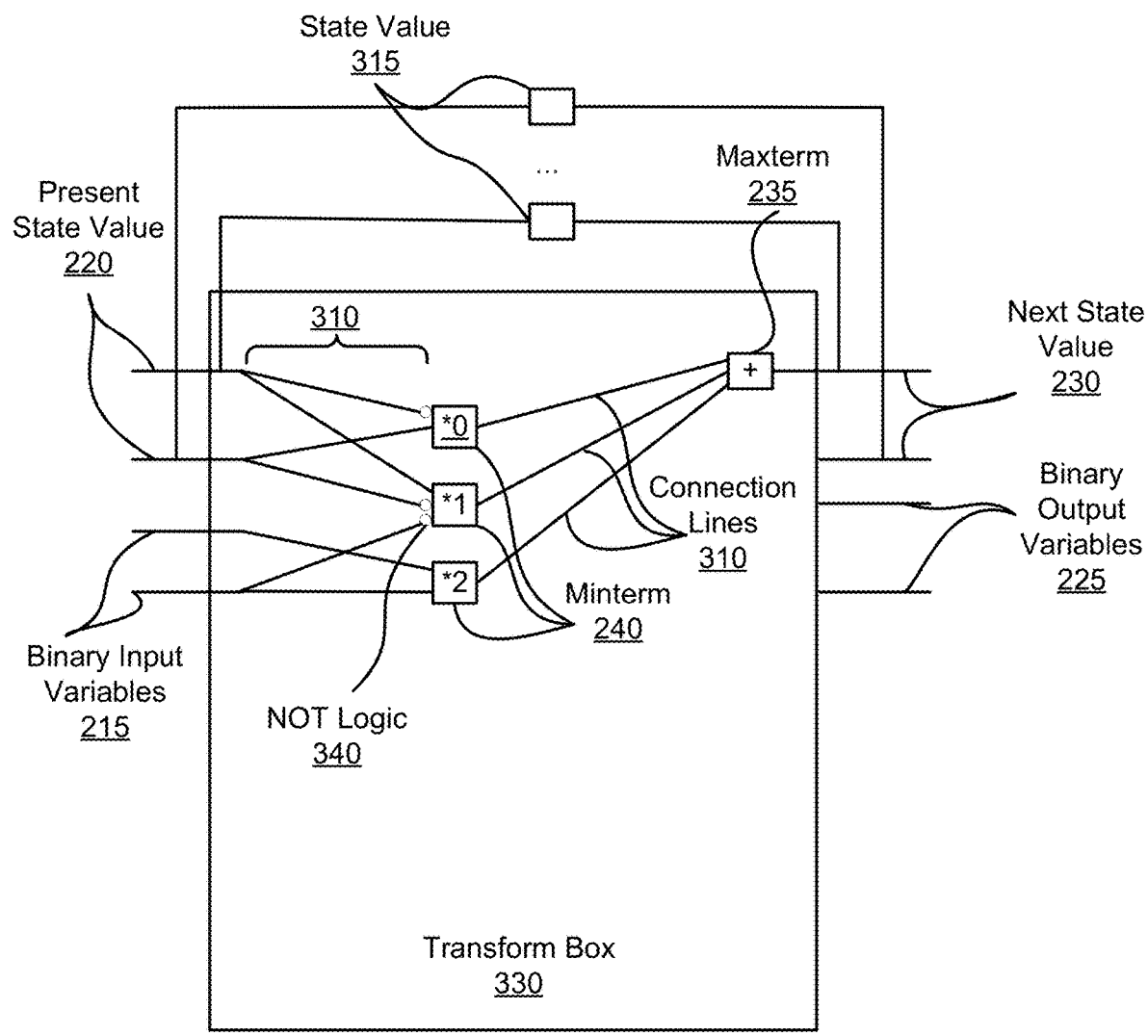
FIG. 3A is a schematic block diagram illustrating one embodiment of a transform box.

FIG. 3A is a schematic block diagram illustrating one embodiment of a transform box 330. The transform box 330 represents one or more logic states 205 as combinatorial logic. The transform box 330 allows undefined logic element relationships to be identified and resolved. Each transform box 330 may be associated with at least one logic state 205 and the field data 250 for the at least one logic state 205. The transform box 330 may be presented as a graphical user interface (GUI) on display. The elements of the transform box 330 may be manipulated by user. In the depicted embodiment, the elements of the transform box 330 include state values 315, the present state values 220, the next state values 230, the binary input variables 215, the NOT logic 340, one or more minterms 240, and one or more maxterms 235. In the depicted embodiment, the transform box 330 shows sum of products logic. Alternatively, the transform box 330 may display product of sums logic.

In one embodiment, only one maxterm 235 is displayed at a given time. Alternatively, each maxterm 235 for the logic state 205 may be displayed concurrently. Each maxterm 235 is represented as a logical sum of one or more minterms 240. Each maxterm 235 defines one or more of a next state value 230 and a binary output variable 225. Alternatively, only one minterm 240 may be displayed for product of sums logic.

Each minterm 240 may be displayed as a function of one or more binary input variables 215 and the NOT logic 340 associated with the binary input variables 215. In addition, each minterm 240 may be displayed as a function of the present state values 220.

The state values 315 may indicate previous next state values 230 that define the present state values 220. The next state values 230 define a next logic state 205. The binary output variables 225 define the actions 174 of the logic state 205.

Connection lines 310 may show the logical relationship of the binary input variables 215 and present state values 220 to minterms 240 and NOT logic 340. In addition, the connection lines 310 may show the logical relationship of the minterms 240 to the maxterms 235. Assertion indicator data 170 may define an assertion value for each connection line 310. A Boolean expression may be derived from the connection lines 310, binary input variables 215, present state values 220, NOT logic 340, minterms 240, and maxterms 235.

In one embodiment, a user may modify a logic state 205 by editing the displayed present state values 220, binary input variables 215, NOT logic 340, minterms 240, maxterms 235, next state values 230, binary output variables 225, and connection lines 310.

Figure 3B:
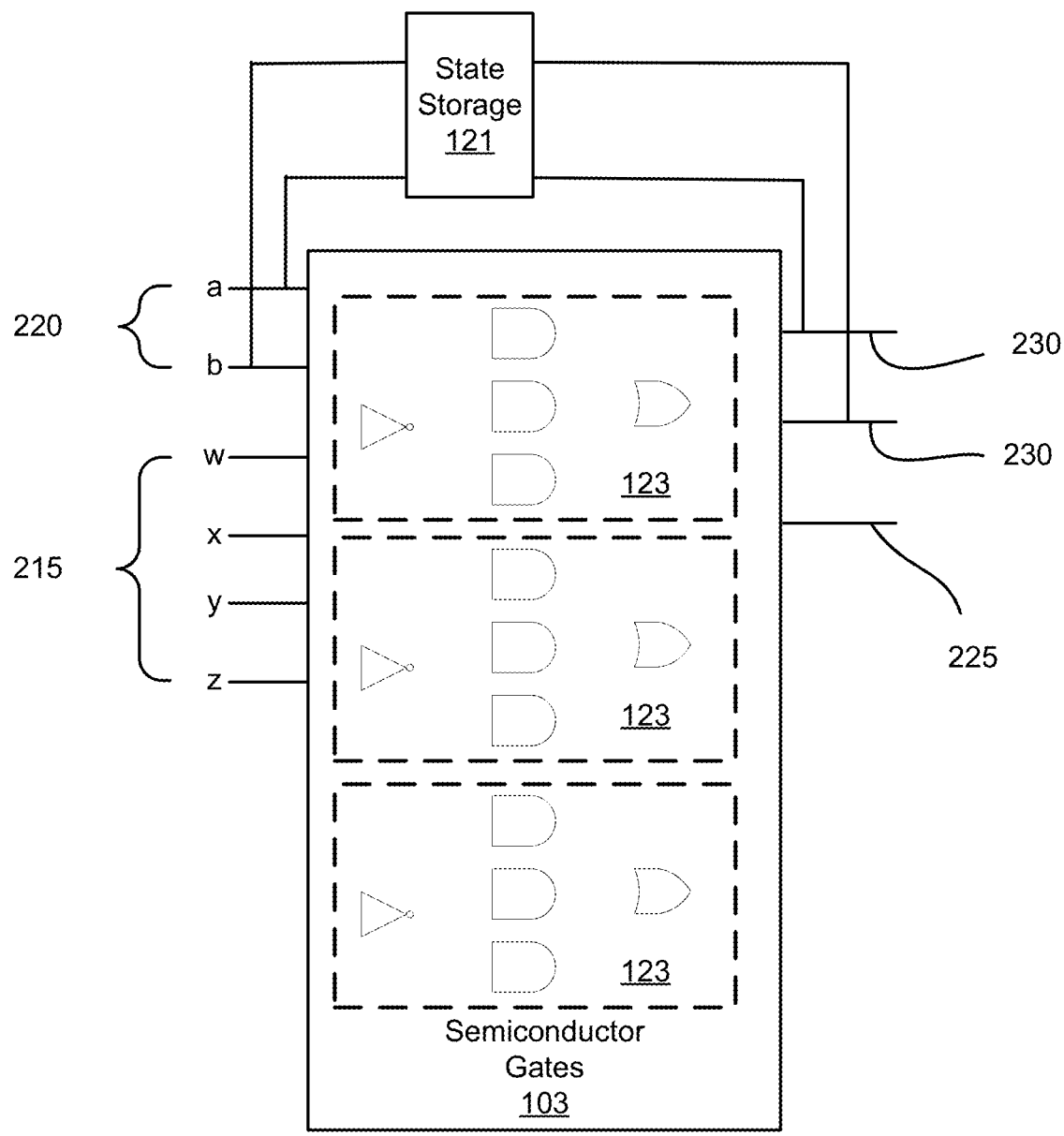
FIG. 3B is a schematic block diagram illustrating one embodiment of semiconductor gates.

FIG. 3B is a schematic block diagram illustrating one embodiment of semiconductor gates 103. The semiconductor gates 103 may be fabricated to implement the final logic design 145. The semiconductor gates 103 receive the present state values 220 and the binary input variables 215 as inputs. The semiconductor gates 103 further generate the next state values 230 and the binary output variables 225. The next state values 230 may be stored in states storage 121. The semiconductor gates 103 may implement the final logic design 145. In one embodiment, the semiconductor gates 103 implement the final logic design 145 with no more than three gate delays.

Figure 4:
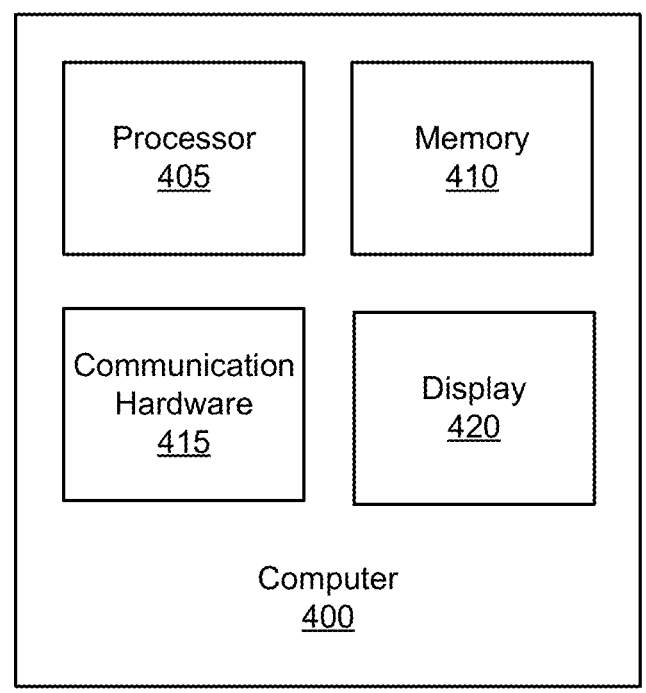
FIG. 4 is a schematic block diagram illustrating one embodiment of a computer.

FIG. 4 is a schematic block diagram illustrating one embodiment of a computer 400. The encoding module 104 and/or the reduction module 105 may be embodied in the computer 400. In the depicted embodiment, the computer 400 includes a processor 405, a memory 410, communication hardware 415, and a display 420. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. In addition, the communication hardware 415 may receive inputs from a user. The display 420 may communicate data to the user.

Figure 5A:
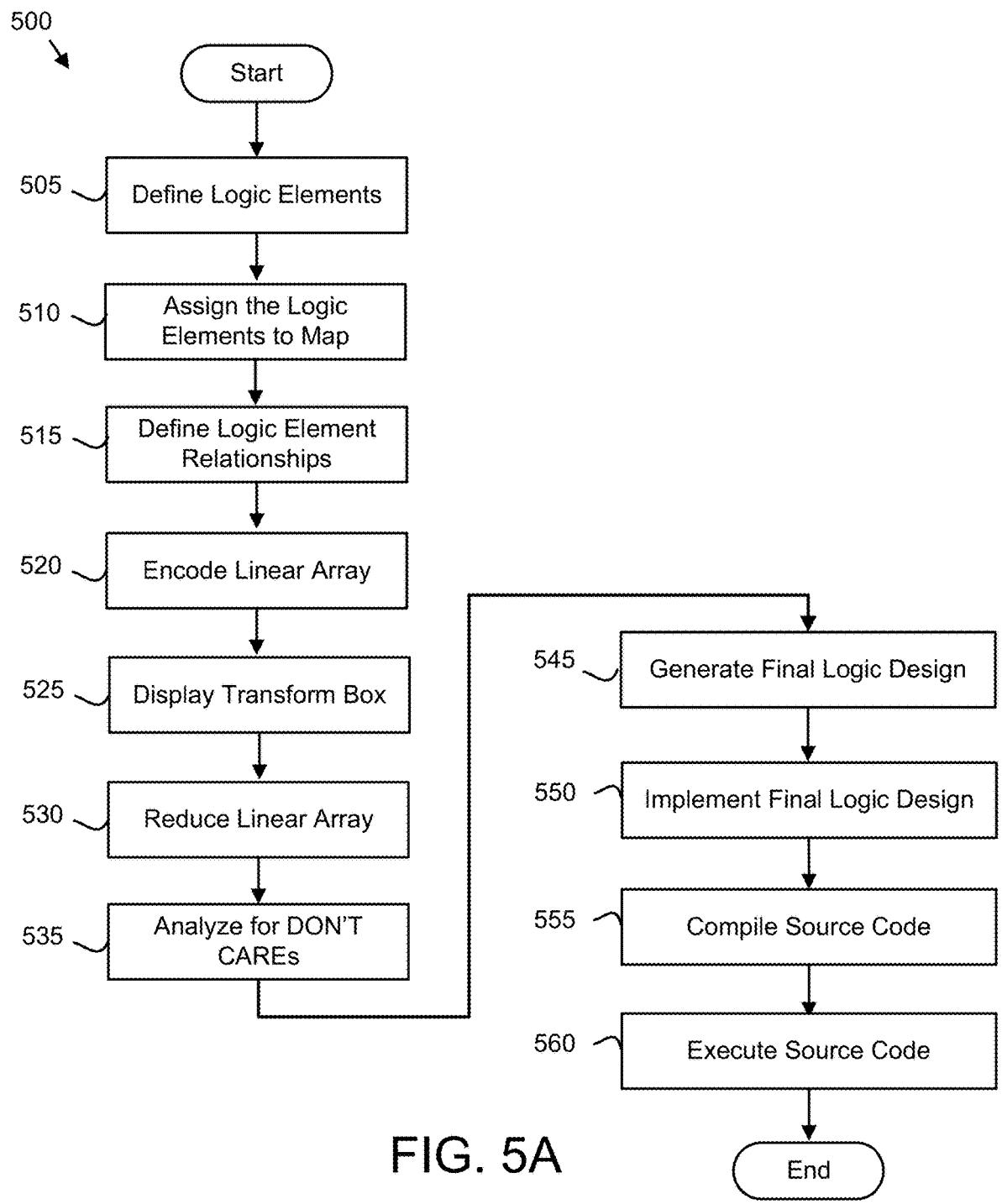
FIG. 5A is a schematic flow chart diagram illustrating one embodiment of a combination map based design method.

FIG. 5A is a schematic flow chart diagram illustrating one embodiment of a combination map based design method 500. The method 500 may receive a logic design 140 from a combination map 190. In addition the method 500 may encode the logic design 140 as a linear array 200 and reduce the linear array 200. The method 500 may be performed by the processor 405. Alternatively, the method 500 may be performed by the computer readable storage medium such as the memory 410. The memory 410 may store code that is executed by the processor 405 to perform the functions of the method 500.

The method 500 starts, and in one embodiment, the code defines 505 the logic elements 176 for a combination map 190. In one embodiment, the code receives definitions of the logic elements 176 as illustrated in FIG. 1C. For example, a user may enter a logic element identifier 210 into the binary variable label field 425, enter an assertion value 290 into the assertion value field 430, and enter a binary variable type into the variable type field 435 2 define the logic element 176.

The code may further assign 510 each logic element 176 to a combination map 190. The code may automatically assign the logic elements 176 to the state input label 485. In addition, the code may receive a modification of the assignment of the logic elements 176 to state input labels 485. For example, a user may drag a logic element identifier associated with a first state input label 485a to a second state input label 485b, modifying the assignment of the logic element 176 on the combination map 190. The code may generate sufficient combination maps 190 on one or more levels to include all of the logic elements 176.

The code may assign 510 logic state logic elements 176 to the combination map 190. For example, the code may create a specified number of fields 125 on the combination map 190. A user may enter the specified number. Alternatively, the specified number of fields 125 may be automatically generated.

In addition, the code may assign 510 present state values 220 of a logic state 205 and/or binary input variables 215 to each field 125 of the combination map 190. In one embodiment, the present state values 220 are assigned 510 to the top level combination map 190. For example, the user may enter a logic state identifier 210 at a given field 125. The code may generate field data 250 associating the field identifier 165 of the given field 125 with the logic state identifier 210. In addition, the code may generate the logic state 205 with the logic state identifier 210. The user may modify the assignments of logic elements 176 to the combination map 190.

In one embodiment, the code defines 515 the logic element relationships for the fields 125 of the combination map 190. In one embodiment, the code receives assertion values 290 for each of the fields 125. The assertion value 290 indicates that the given combination of asserted and deasserted binary input variables 215 and present state values 220 associated with the field 125 will result in the field 125 being asserted.

The code may encode 520 the combination maps 190 as the logic states 205 of the linear array 200. In one embodiment, the code generates a Boolean equation for each binary output variable 225 and each next state value 230 from the binary input variable 215 and present state value 220 logical elements 176. Each Boolean equation may comprise products of logical elements 176 and sums of the products of logical elements 176. The products of logical elements 176 may be encoded 520 as the minterms 240. In addition, the sums of the products of logical elements 176 may be encoded 520 as the maxterms 235.

Alternatively, the code generates the Boolean equation as a product of sums of the logical elements 176. The code may encode 520 each some of logical elements 176 as a maxterm 235 and each product of the sums of the logical elements 176 as a minterm 240.

The code may display 525 the transform box 330 for one or more selected fields 125. The display of the transform box 330 is described in more detail in FIG. 5B. The display of the transform box 330 may be modified as the selection of the one or more fields 125 is modified. For example, the code may receive 520 a cursor hover selection of a first field 125 and display 525 the transform box 330 for the selected first field 125. The code may subsequently receive 520 a cursor hover selection of a second field 125 and display 525 the transform box 330 for the selected second field 125.

In one embodiment, the code reduces 530 the linear array 200 to a set of minimal logical expressions. The code may employ one or more of the Quine-McClusky algorithm and Espresso to reduce the linear array 200.

The code may analyze 535 the linear array 200 for execution time improvements resulting from modifying the binary input variables 215 and the present state values 220 by replacing asserted or deasserted assertion values 290 with DON'T CARE assertion values 290. The analysis 535 may determine if execution times for portions of the final logic design 145 may be reduced by employing DON'T CARE assertion values 290. The analysis 535 is described in more detail in FIG. 5E.

The processor 405 may generate 545 the final logic design 145 from the linear array 200 with the final logic design 145 reduced by employing DON'T CARE assertion values 290. The final logic design 145 may include Boolean logic from the linear array 200.

In one embodiment, the processor 405 implements 550 the final logic design 145. The processor 405 may implement 550 the logic design 145 in hardware by fabricating semiconductor gates 103 that implement the Boolean logic. In addition, the processor 405 may implement 550 the logic design in software by generating software code 102 that implements the Boolean logic.

In one embodiment, the processor 405 compiles 555 the software code 102. The processor 405 may further execute 560 the compiled software code 102 on the machine 107 and the method 500 ends.

Figure 5B:
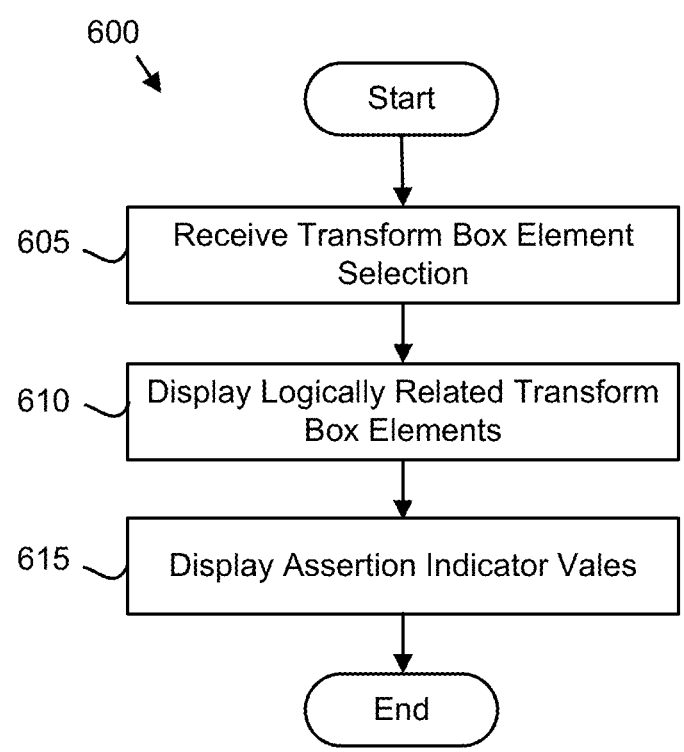
FIG. 5B is a schematic flow chart diagram illustrating one embodiment of a transform box display method.

FIG. 5B is a schematic flow chart diagram illustrating one embodiment of a transform box display method 600. The method 600 may display the transform box 330 as described in step 525 of FIG. 5A. The method 600 may be performed by the processor 405. Alternatively, the method 600 may be performed by the computer readable storage medium such as the memory 410. The memory 410 may store code that is executed by the processor 405 to perform the functions of the method 600.

The method 600 starts, and in one embodiment, the code receives 605 a transform box element selection. The transform box elements include connecting lines 310, binary input variables 215, present state values 220, minterms 240, maxterms 235, binary output variables 225, next state values 230, and state values 315 of the transform box 330. The transform box element may be selected with one of a cursor hover and a cursor selection.

The code may display 610 logically related transform box elements. For example, if a first next state value 230 is selected, the code may display 610 the first maxterm 235 that generates the first next state value 230, the connecting line 310 between the first maxterm 235 and the first next state value 230, the first minterms 240 that generate the first maxterm 235, the connecting lines 310 between the first minterms 240 and the first maxterm 235, the first binary input variables 215 and the first present state values 220 that generate the first minterms 240, and the connecting lines 310 between the first binary input variables 215 and the first present state values 220 and the first minterms 240.

In one embodiment, the code displays 615 assertion values 290 for each transform box element as defined by the assertion indicator data 170 for that transform box element and the method 600 ends. The assertion value 290 may indicate that a transform box element is one of asserted and deasserted.

Figure 5C:
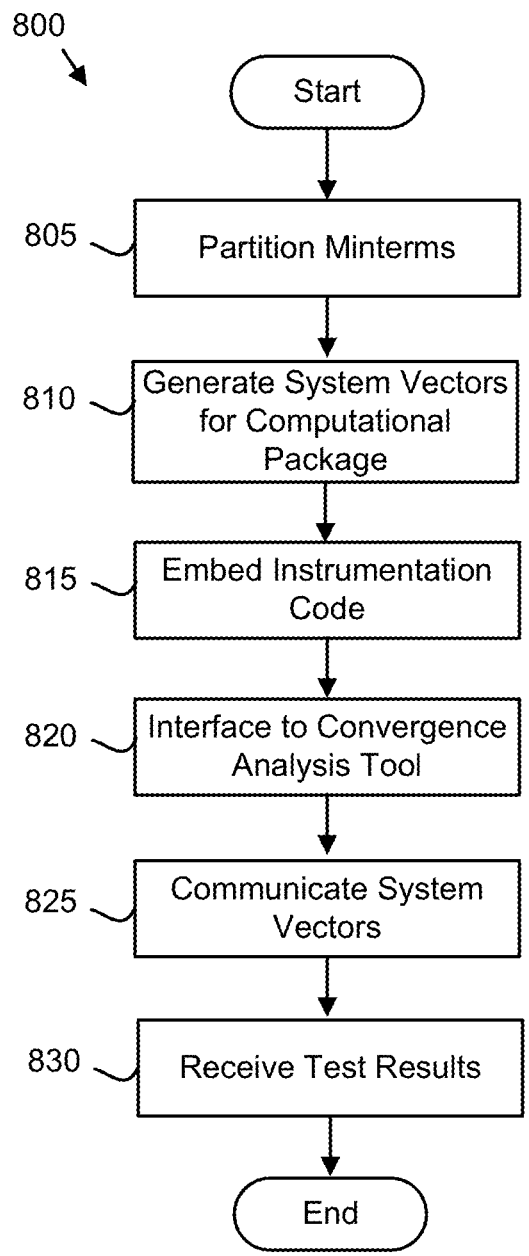
FIG. 5C is a schematic flowchart diagram illustrating one embodiment of a convergence analysis method.

FIG. 5C is a schematic flowchart diagram illustrating one embodiment of a convergence analysis method 800. The method 800 may validate the final logic design 145. The method 800 may be performed by the processor 405. Alternatively, the method 800 may be performed by the computer readable storage medium such as the memory 410. The memory 410 may store code that is executed by the processor 405 to perform the functions of the method 800.

The method 800 starts, and in one embodiment, the code partitions 805 the minterms 240 of each logic state 205 in the linear array 200 between the defined package 435 and the computational package 440. For example, each minterm 240 may be partitioned to one of the defined package 435 and the computational package 440. In one embodiment, the package destination for each minterm 240 is recorded in the package identifier 461.

In one embodiment, the user selects an indicator for a field 125 to partition 805 a minterm 240 to either the defined package 435 or the computational package 440. Alternatively, the code may automatically partition 805 each minterm 240 to the defined package 435 or the computational package 440. In one embodiment, minterms 240 with binary input variables 215 and present state values 220 defined by input variables 162 of one or more system vectors 161 and/or binary output variables 225 and next state values 230 defined by output variables 163 of the one or more system vectors 161 may be automatically partitioned 805 to the defined package 435.

The code may embed 815 instrumentation code in the computational package 440. The instrumentation code may include one or more stubbed functions that provide visibility and access to the minterms 240 of the computational package 440.

The code may interface 820 the computational package 440 and the defined package 235 to a convergence analysis tool 445. The code may interface 820 the computational package 440 and the defined package 435 to the convergence analysis tool 445 by allowing the convergence analysis tool 445 to read from and write to the defined package 435 and the computational package 440.

The code may further communicate 825 one or more system vectors 161 to the convergence analysis tool 445. The convergence analysis tool 445 may process the system vectors 161 using the defined package 435 and the computational package 440 and communicate test results to the code. The code may receive 830 the test results and the method 800 ends.

Figure 5D:
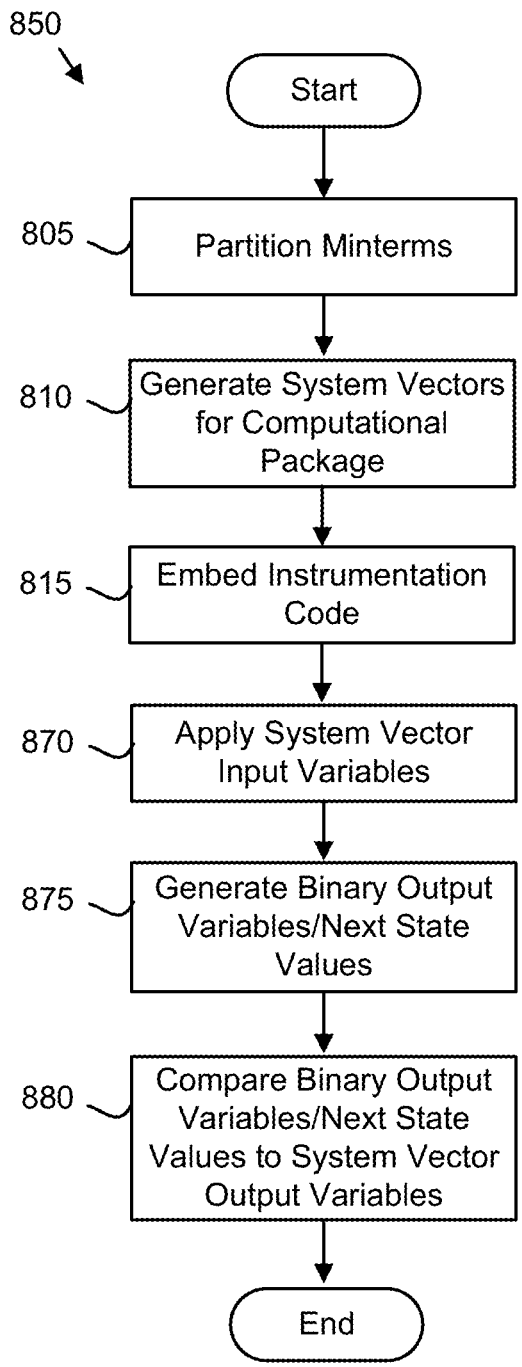
FIG. 5D is a schematic flowchart diagram illustrating one alternate embodiment of a convergence analysis method.

FIG. 5D is a schematic flowchart diagram illustrating one alternate embodiment of a convergence analysis method 850. The method 850 may validate the final logic design 145. The method 850 may be performed by the processor 405. Alternatively, the method 850 may be performed by the computer readable storage medium such as the memory 410. The memory 410 may store code that is executed by the processor 405 to perform the functions of the method 850.

The method 850 starts, and in one embodiment, the code partitions 805 minterms 240, generates 810 system vectors 161, and embeds 815 the instrumentation code as described for FIG. 5C. In addition, the code applies 870 the input variables 162 of the system vectors 161 to the defined package 435. In one embodiment, the code applies the assertion values 290 for the input variables 162 to the minterms 240 of the defined package 435 and calculates the binary output variables 225 and the next state values 230 resulting from the input variables 162.

The code may further generate 875 binary output variables 225 and next state values 230 for the minterms 240 of the computational package 440 in response to the system vector input variables 162. The binary output variables 225 and the next state values 230 may be calculated from the binary input variables 215, binary output variables 225, present state values 220, and the next state values 230 of the defined package 435.

The code may further compare 880 the binary output variables 225 and the next state values 230 generated for the computational package 440 to the output variables 163 of the system vectors 161. The code may detect a design error if the generated binary output variables 225 and next state values 230 do not match the corresponding system vector output variables 163.

Figure 5E:
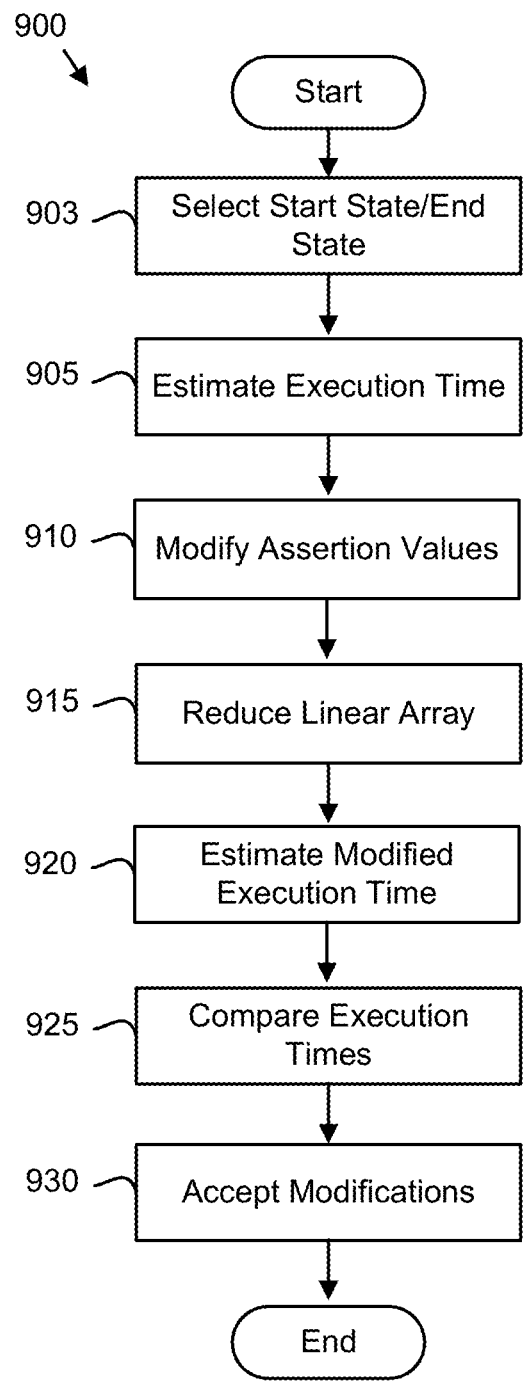
FIG. 5E is a schematic flowchart diagram illustrating one alternate embodiment of an execution time comparison method.

FIG. 5E is a schematic flowchart diagram illustrating one alternate embodiment of an execution time comparison method 900. The method 900 may perform the analyze for DON'T CARE step 535 of FIG. 5A. The method 900 may compare execution times for the final logic design 145 with and without the use of DON'T CARE assertion values 290. The method 900 may be performed by the processor 405. Alternatively, the method 900 may be performed by the computer readable storage medium such as the memory 410. The memory 410 may store code that is executed by the processor 405 to perform the functions of the method 900.

The method 900 starts, and in one embodiment, the code selects 903 a first logic state 205 as a start state and the second logic state 205 as an end state. The start state and the end state may be automatically selected 903 to test a logical path of the final logic design 145. For example, the start state may begin the logical path and the end state may end the logical path. Alternatively, the user may select the start state and the end state using the combination maps 190. The logical path may be a critical path.

The code may estimate 905 an execution time for one or more given logic states 205 of the logical path between the start state and the end state. The code may estimate 905 the execution time based on the logic elements such as minterms 240 and maxterms 235 required to implement the one or more given logic states 205.

The code may modify 910 the assertion values 290 for one or more given binary input variables 215 and one or more given present state values 220 of the one or more given logic states 205 to DON'T CARE assertion values 290. In one embodiment, the code automatically modifies 910 the assertion values 290 for binary input variables 215 and/or present state values 220 that may be modified to DON'T CARE assertion values 290 without modifying the logical function of the final logic design 145. For example, if a first binary input variable 215 may be either asserted or deasserted without changing the logical function of the final logic design 145, the assertion value 290 for the first binary input variable 215 may be modified 910 to a DON'T CARE assertion value 290.

Alternatively, the code may modify 910 the assertion values 290 for the given binary input variables 215 and the given present state values 220 selected by the user. For example, the user may use the combination maps 192 modify 910 assertion values 290 to DON'T CARE assertion values 290.

The code may reduce 915 the linear array 200 with the modified assertion values 290 using a Boolean minimization algorithm. The Boolean minimization algorithm may be one of the Quine-McClusky algorithm and the Espresso algorithm.

The code may further estimate 920 the modified execution time for the one or more given logic states 205 with the DON'T CARE assertion values 290. In one embodiment, the code estimates 920 the modified execution time for the one or more given logic states 205 of the logical path between the start state and the end state. The code may estimate 920 the execution time based on the logic elements such as minterms 240 and maxterms 235 required to implement the one or more given logic states 205.

In one embodiment, the code compares 925 the execution time and the modified execution time. The comparison of the execution time in the modified execution time may be displayed to the user.

The code may accept 930 the modifications to the one or more given binary input variables 215 and the one or more given present state values 220 and the method 900 ends. Accepting 930 the modifications may incorporate the modifications to DON'T CARE assertion values 290 to the logic array 200. In one embodiment, the code accepts 930 the modifications if the modifications result in a faster execution time. Alternatively, the code may accept 930 the modifications in response to a command from the user.

Figure 6A:
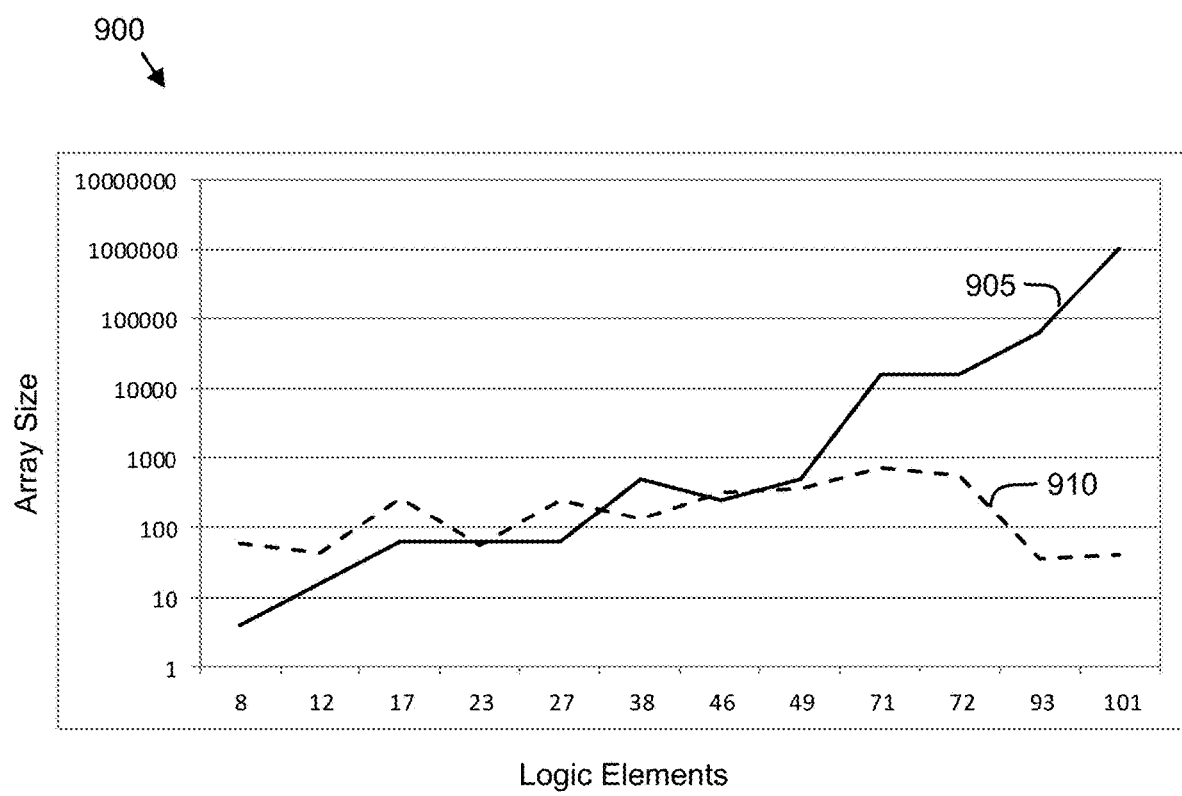
FIG. 6A is a graph illustrating one embodiment of array complexity.

FIG. 6A is a graph 900 illustrating one embodiment of array complexity. The graph 900 shows an array size 905 for a multidimensional array of the logic design 140 and an array size 910 for a corresponding linear array 200 for multiple pairs of identical function implementations with various numbers of logic elements. The array size 905, 910 is shown on a log scale. Array size 905, 910 is one measure of array complexity and a good predictor of the computational overhead required to process an array.

The graph 900 illustrates that the array complexity for multidimensional arrays quickly becomes orders of magnitude more complex than the corresponding linear array 200 representation. By encoding the logic design 140 as a linear array 200, the computational complexity of processing the linear array 200 is greatly reduced.

Figure 6B:
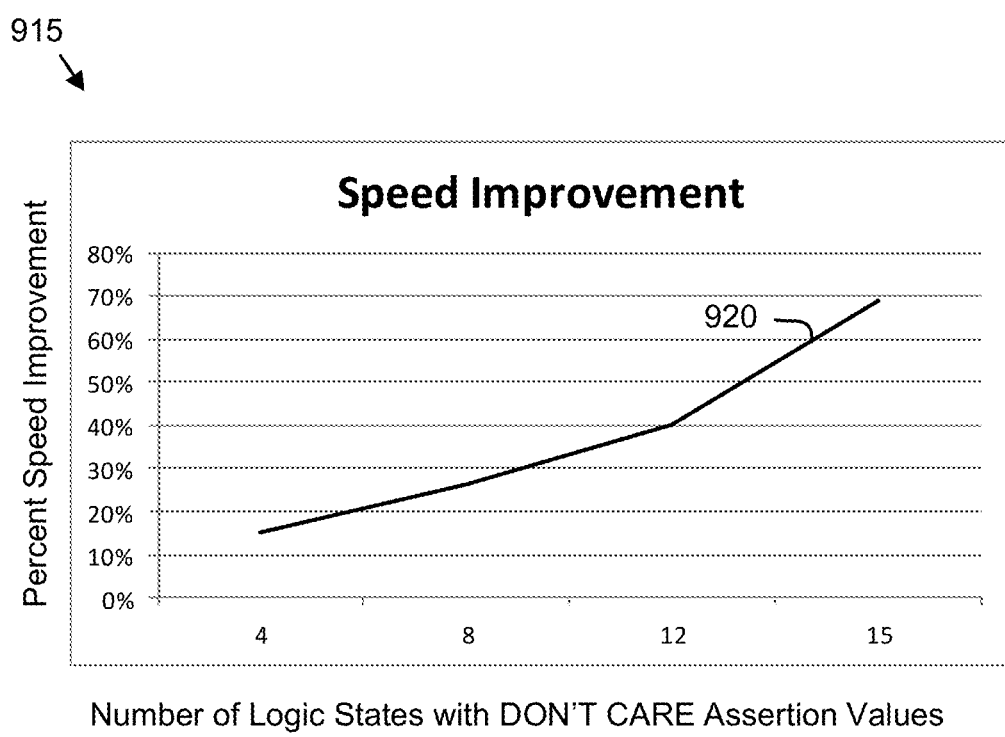
FIG. 6B is a graph illustrating one embodiment of speed improvements from identifying DON'T CARE assertion values.

FIG. 6B is a graph 915 illustrating one embodiment of speed improvements 920 from identifying DON'T CARE assertion values 290. A percentage speed improvement is shown as a result of identifying DON'T CARE assertion values 290 for minterms 240 of 4, 8, 12, and 15 logic states 205 of an exemplary linear array 200. The speed improvement 920 is calculated by comparing processing time for the exemplary linear array 200 without identifying the DON'T CARE assertion values 290, and the processing time for the exemplary linear array 200 when DON'T CARE assertion values 290 are identified for 4, 8, 12, and 15 minterms 240 of the linear array 240 shown in Table 1. Table 1 shows an estimate of processing time as a function of linear array size for minterms 240 of 4, 8, 12, and 15 logic states 205 having either deasserted assertion values 290 or DON'T CARE assertion values 290.

TABLE 1

|  | 4 Logic States | 8 Logic States | 12 Logic States | 15 Logic States |
|---|---|---|---|---|
| Deasserted | 645 | 499 | 362 | 251 |
| DON'T CARE | 547 | 369 | 216 | 78 |

The graph 915 shows the processing perform efficiencies that are realized from identifying DON'T CARE assertion values 290.

The embodiments employ the combination maps 192 define the logic elements for the logic design 140. In addition, the embodiments define the logic element relationships between the logic elements using the combination map 190 and encode the logic elements and logic element relationships into the logic states 205 of the linear array 200. Because the combination maps 190 define a complete set of all logic element relationships, the linear array 200 may include no undefined logic element relationships. In addition, the linear array 200 simplifies the analysis and manipulation of the logic element relationships, resulting in a more robust final logic design 145.

The embodiments may further estimate execution times for a logical path between a start state and an end state with and without modifying some binary input variables 215 and/or present state values 220 to DON'T CARE assertion values 290. The embodiments may compare the estimated execution times and accept the modifications that result in faster execution times.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
defining, by use of a processor, one or more logic elements comprising one or more binary output variables and one or more binary input variables;
assigning the one or more logic elements to a combination map;
defining one or more logic element relationships between the logic elements on the combination map;
encoding a plurality of fields of the combination map as a linear array comprising a plurality of logic states, each logic state comprising the one or more binary output variables, the one or more binary input variables, one or more minterms of the one or more binary input variables, one or more maxterms of the one or more minterms, one or more present state values, and one or more next state values;
partitioning the one or more minterms of the linear array between a defined package and a computational package, wherein the assertion values of each minterm in the defined package is specified and the assertion values of each minterm in the computational package is calculated as a function of the defined package minterms;
generating system vectors for the linear array, wherein each system vector comprises binary input variables and binary output variables;
validating the linear array by processing the system vectors using the computational package and the defined package;
generating a final logic design comprising Boolean logic from the validated linear array; and
implementing the final logic design in hardware by fabricating semiconductor gates that implement the Boolean logic.

2. The method of claim 1, the method further comprising embedding instrumentation code in the computational package.

3. The method of claim 1, wherein each system vector comprises input variables comprising given binary input variables and given present state values and output values comprising corresponding binary output variables and next state values for the given binary input variables and given present state values.

4. The method of claim 3, wherein the system vectors exercise all logic elements of a Boolean equation predicate.

5. The method of claim 3, the method further comprising:
interfacing the computational package and the defined package to a convergence analysis tool;
communicating the system vectors to the convergence analysis tool; and
receiving test results from the convergence analysis tool.

6. The method of claim 3, the method further comprising:
applying the system vector input variables to the defined package;
generating binary output variables and next state values for the computational package in response to the system vector input variables; and
comparing the binary output variables and next state values of the computational package to the system vector output values.

7. The method of claim 1, wherein the one or more minterms and the one or more binary input variables are defined from the logic element relationships.

8. The method of claim 1, the method further comprising reducing the linear array using a Boolean minimization algorithm.

9. The method of claim 8, wherein the Boolean minimization algorithm is selected from the group of algorithms consisting of a Quine-McClusky algorithm and an Espresso algorithm.

10. The method of claim 8, the method further comprising:
estimating an execution time for one or more given logic states of a logical path between a start state and an end state;
modifying an assertion value for one or more given binary input variables and one or more given present state values to a DON'T CARE;
estimating a modified execution time for the one or more given logic states with the DON'T CARE assertion value; and
comparing the execution time and the modified execution time.

11. The method of claim 1, wherein the one or more logic element relationships are defined using a transform box.

12. The method of claim 1, wherein the plurality of fields is organized by:
- organizing the plurality of binary input variables into the plurality of fields in one or more combination maps, each field of the plurality of fields corresponding to a respective display level of a multi-level display format having a top display level combination map and at least one lower display level combination map;
- selecting a first field of the plurality of fields, the first field corresponding to a first display level;
- identifying combinations of the binary input variables of a successive combination map that logically defines the first field of the plurality of fields, wherein the successive combination map is at a successive display level lower than the first display level;
- displaying at each successive display level, combination maps of additional binary input variables that logically define the first field at each successive level until a last display level is reached; and
- converting the combination of binary input variables for each display level into a logical expression.

13. A program product comprising a non-transitory computer readable storage medium that stores code executable by a processor to perform:
- defining one or more logic elements comprising one or more binary output variables and one or more binary input variables;
- assigning the one or more logic elements to a combination map;
- defining one or more logic element relationships between the logic elements on the combination map;
- encoding a plurality of fields of the combination map as a linear array comprising a plurality of logic states, each logic state comprising the one or more binary output variables, the one or more binary input variables, one or more minterms of the one or more binary input variables, one or more maxterms of the one or more minterms, one or more present state values, and one or more next state values;
- partitioning the one or more minterms of the linear array between a defined package and a computational package, wherein the assertion values of each minterm in the defined package is specified and the assertion values of each minterm in the computational package is calculated as a function of the defined package minterms;
- generating system vectors for the linear array, wherein each system vector comprises binary input variables and binary output variables;
- validating the linear array by processing the system vectors using the computational package and the defined package;
- generating a final logic design comprising Boolean logic from the validated linear array; and
- implementing the final logic design in hardware by fabricating semiconductor gates that implement the Boolean logic.

14. The program product of claim 13, the code further performing embedding instrumentation code in the computational package.

15. The program product of claim 13, wherein each system vector comprises input variables comprising given binary input variables and given present state values and output values comprising corresponding binary output variables and next state values for the given binary input variables and given present state values.

16. The program product of claim 15, the code further performing:
- interfacing the computational package and the defined package to a convergence analysis tool;
- communicating the system vectors to the convergence analysis tool; and
- receiving test results from the convergence analysis tool.

17. The program product of claim 15, the method further comprising:
- applying the system vector input variables to the defined package;
- generating binary output variables and next state values for the computational package in response to the system vector input variables; and
- comparing the binary output variables and next state values of the computational package to the system vector output values.

18. An apparatus comprising:
- a processor;
- a non-transitory memory that stores code executable by the processor to perform:
- defining one or more logic elements comprising one or more binary output variables and one or more binary input variables;
- assigning the one or more logic elements to a combination map;
- defining one or more logic element relationships between the logic elements on the combination map;
- encoding a plurality of fields of the combination map as a linear array comprising a plurality of logic states, each logic state comprising the one or more binary output variables, the one or more binary input variables, one or more minterms of the one or more binary input variables, one or more maxterms of the one or more minterms, one or more present state values, and one or more next state values;
- partitioning the one or more minterms of the linear array between a defined package and a computational package, wherein the assertion values of each minterm in the defined package is specified and the assertion values of each minterm in the computational package is calculated as a function of the defined package minterms;
- generating system vectors for the linear array, wherein each system vector comprises binary input variables and binary output variables;
- validating the linear array by processing the system vectors using the computational package and the defined package;
- generating a final logic design comprising Boolean logic from the validated linear array; and
- implementing the final logic design in hardware by fabricating semiconductor gates that implement the Boolean logic.

* * * * *